Sept. 14, 1943.   C. W. EDDY   2,329,598
MICROMETER
Filed Sept. 11, 1941
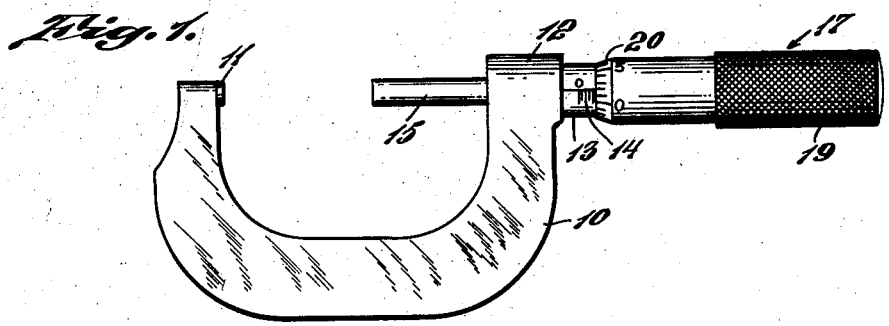
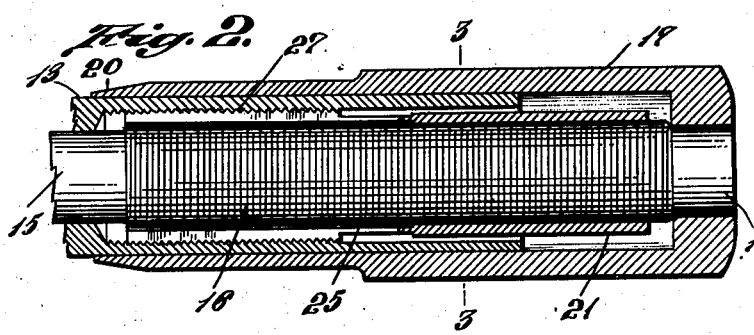 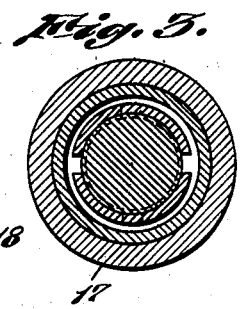
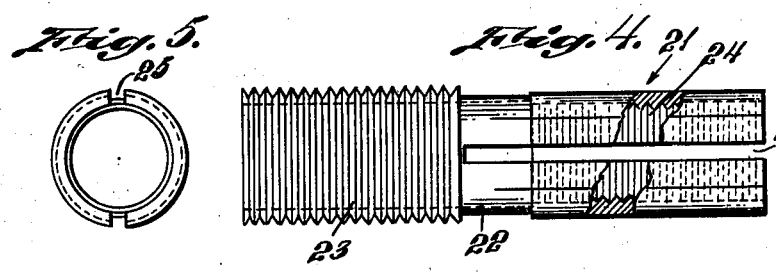 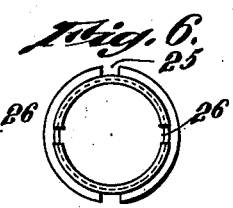
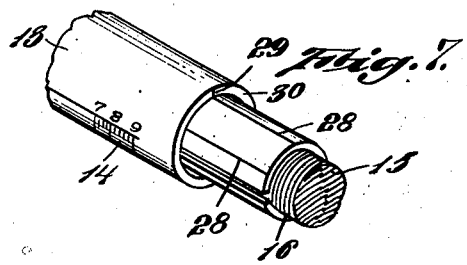
INVENTOR
Charles W. Eddy
BY
Barlow & Barlow
ATTORNEYS.

Patented Sept. 14, 1943

2,329,598

UNITED STATES PATENT OFFICE 2,329,598

MICROMETER

Charles W. Eddy, East Providence, R. I.

Application September 11, 1941, Serial No. 410,419

6 Claims. (Cl. 33—164)

This invention relates to small measuring tools such, for instance, as a micrometer.

It is usual in the manufacture of micrometers to lap the threaded measuring rod into threads in the barrel in order that perfect fit of these two parts, which require great accuracy in measurement, may be had. Such lapping causes each instrument to be individual in that the measuring rods are not interchangeable and cannot be replaced from stock, as a new measuring rod thus must be lapped into the barrel if the parts require replacement. This manner of assembly is costly. In the manufacture of micrometers of the type herein illustrated, some adjustment of the anvil has heretofore been provided so that if the measuring graduations do not line up correctly the graduations may be set at zero and an adjustment of the anvil made so that the readings will measure correctly from a zero point. Such an adjustment of the anvil makes necessary additional parts that such adjustment may be had. It is also usual in micrometers to have some resilient action between the measuring rod and the barrel for wear compensation. The amount of resilient action is usually adjusted by some separate part, also requiring careful and skillful assembly operations.

This invention has for one of its objects to provide a fewer number of parts than is usual in micrometers of this character and an arrangement of the parts used so that assembly operations and consequent assembly costs may be simplified and reduced.

Another object of the invention is to make the parts of the micrometer so that the parts may be interchanged and assembled without the necessity of lapping in the parts and thus make an instrument which is not individual in character but rather one which is a product of multiple unit production with a simple assembly operation.

Another object of the invention is to provide an instrument in which adjustment of the measuring rod for registering of the calibrated scale may occur without shifting of the anvil.

Another object of the invention is to provide for the adjustment of the measuring rod to cause registry of the calibrated scale in a predetermined calculated amount without necessity of depending upon trial and error.

Another object of the invention is to minimize local wear along the threads of the measuring rod.

Another object of the invention is to provide for the slipping-by of threads between the parts if too great a pressure is brought to bear on the measuring rod by reason of turning thereof into too tight a position.

With these and other objects in view, the invention consists of certain novel features of construction, as will be more fully described, and particularly pointed out in the appended claims.

In the accompanying drawing:

Fig. 1 is a plan view of the micrometer made in accordance with this invention;

Fig. 2 is a section through the barrel, thimble and nut member provided in my instrument;

Fig. 3 is a section on line 3—3 of Fig. 2;

Fig. 4 is an elevation, partly broken away, illustrating the nut member about which this invention is centered;

Fig. 5 is an end view of one end of this nut member;

Fig. 6 is an end view of the other end of the nut member; and

Fig. 7 is a perspective view of a portion of the barrel, a portion of the nut member, and a portion of the threaded part of the measuring rod, showing certain relationships between these parts.

With reference to the drawing, 10 designates the frame of the micrometer which is generally U-shape, as illustrated in Fig. 1, and is provided with an anvil 11 at one end and an enlarged portion 12 providing a bearing at the other end. A barrel 13 is fixed to the end portion 12 of the frame and is provided with measuring graduations 14 along its longitudinal extent as is usual in micrometers of this character. A measuring rod 15 is rotatably mounted in the bearing portion 12 and is provided with threads 16 along a portion of its length, while a thimble 17 is fixed to the end 18 of the measuring rod to move therewith. The thimble is knurled as at 19 to provide a finger manipulating portion, while it is beveled as at 20 and provided with graduations to be read with the measuring graduations on the barrel. The threads 16 of the measuring rod are usually forty threads to the inch, while the divisions on the bevel portion 20 are usually twenty-five in number so that measurements in one one-thousandth of an inch may be indicated.

The parts which are so far described are parts which are familiar parts of a micrometer caliper of the type to which this invention relates. However, in connection with this invention, the barrel 13 is modified, and I have provided a new part, designated generally 21 and shown by itself in Fig. 4, which is a nut member supported by the barrel and is the part about which this invention centers.

This nut 21 consists of a tubular sleeve 22 having external threads 23 extending inwardly from one end and interior threads 24 extending inwardly from the other end. A plurality of slots 25, here shown as two, extend longitudinally inwardly from one end along the threads 23, while a plurality of slots 26, here shown as two, extend longitudinally inwardly from the opposite end of the sleeve and in staggered relation with reference to the slots 25. The slots both extend beyond the threaded portions in which they are located and extend one past the other in the non-threaded portion of the sleeve in the mid portion between the two threaded portions. These slots provide for considerable resilience of the sleeve.

The long slots 25 and 26 provide for a long resilient leverage arm in which the threads of the nut are located and thus an arrangement where a large number of threads will be caused to engage the threads of the rod even though flexing occurs and a corresponding greater distribution of wear by reason of this engagement will occur. Thus, the usual wear point is not as localized in this instrument as in the instruments with which I have heretofore been familiar.

The long slots are sufficiently wide as to leave corresponding arms which carry the threads of such an arc as to provide for sufficient movement of the arms to permit the arms' springing apart and out of engagement with the threads 16 of the measuring rod, should too great a pressure be brought to bear by screwing the rod against the anvil or against some work which is being measured intermediate the ends of the rod and the anvil and thus would prevent damage occurring to the instrument, such as to the frame, the threads going back into place nicely upon release of this pressure. This may take the place of the ratchet stop.

The nut 21 has its threads 23 engaging internal threads 27 in the barrel spaced inwardly from one end thereof, while the threads 24 engage the threads 16 on the measuring rod. The arrangement of the resilience caused by the slots due to the position in which the nut is held while handling relative to the part which is to be engaged is such that the greater tension will be exerted upon the part which the threads 23 engage than the exertion of pressure on the parts which the threads 24 engage. By the arrangement of the different forces exerted by these resilient portions of the nut, should the measuring rod be turned with reference to the barrel, this measuring rod will be advanced or retracted along the threads 24 rather than the nut being turned because of the greater holding pressure between the nut and the barrel than between the measuring rod and the nut. However, if desired, some other means may be provided for relatively holding the nut member 21 and the barrel in non-rotative position after the adjustment has been made.

In order to provide for adjustment that the graduations may properly register, I provide a different pitch of the threads 23 than of the threads 24; for instance, there may be provided approximately thirty-nine threads per inch of the threads 23, whereas I provide, as stated before, forty threads per inch of the threads 24. By reason of this differential, I may adjust the nut 21 in the barrel so that the graduations may become properly registered and make adjustment of the anvil 11 unnecessary. In order to assist in this adjustment, I have provided graduations 28 running longitudinally along the outer surface of the nut member 21 and have provided an indicia mark 29 on the end 30 of the barrel. For instance, I may provide six of such marks 28 evenly spaced about the barrel which, upon the selection of the proper number of threads per inch at 23 relative to forty threads per inch at 24, will provide one-ten-thousandths of adjustment for the relative rotation of the nut member 21 with reference to the barrel 13. Such selection is a fraction from thirty-nine threads per inch. Thus, should I find that there is an error of three-ten-thousandths between the end of the measuring rod and the end of the anvil, I may adjust the nut 21 a distance corresponding to three of the graduations 28 to overcome this discrepancy; and by this arrangement I provide the mathematical means of calculation of error in the instrument which may be at once quickly compensated for by adjustment without necessity of trial and error.

By reason of the construction which I have provided and the adjustment with the long easy resilience of the nut, the parts are interchangeable between the different instruments, and it is unnecessary to lap the threads of the measuring rod into the threads which cause the movement of the measuring rod and thus make each instrument specialized to the extent that interchange cannot be had.

I claim:

1. In a micrometer having a frame, an internally threaded barrel, and a threaded measuring rod, a separate member, threads for adjustably securing the member to said barrel, said member being provided with threads engaging the threads of said measuring rod for advancement of said rod upon rotation relative to said member, said member being longitudinally split from opposite ends thereof to provide resilience of the member and said member resiliently engaging the threads of said measuring rod and said barrel.

2. In a micrometer having a frame, a barrel, and a threaded measuring rod, a separate member, means for adjustably securing the member to said barrel, said member being provided with threads engaging the threads of said measuring rod for advancement of said rod upon rotation relative to said member, said member being longitudinally split from opposite ends thereof to provide resilience of the member and said member resiliently engaging said measuring rod and said barrel, and the resilience of the engagement of said member at its opposite end portions being such that greater pressure is exerted on said barrel than on said measuring rod.

3. In a micrometer having a frame, a barrel, and a threaded measuring rod, a separate member threaded into said barrel and provided with threads engaging the threads of said measuring rod for axial movement of said rod upon rotation relative to said member, said member being longitudinally split from opposite ends thereof to provide resilience of the member and said member resiliently engaging said measuring rod and said barrel.

4. In a micrometer having a frame, a barrel, and a threaded measuring rod, a separate member threaded into said barrel and provided with threads engaging the threads of said measuring rod for axial movement of said rod upon rotation relative to said member, said member being longitudinally split from opposite ends thereof to provide resilience of the member and said member resiliently engaging said measuring rod and said barrel, and the resilience of the engagement of said member at its opposite end portions being such that greater pressure is exerted on said barrel than on said measuring rod.

5. In a micrometer having a frame, an internal threaded barrel and a threaded measuring rod, a separate member provided with threads engaging the threads of said barrel and threadingly engaging the threads of said measuring rod for advancement of said rod upon rotation relative to said member, said member being longitudinally split along said threads engaging said barrel to provide resilience of the member and said member resiliently engaging the threads of the barrel with sufficient friction to hold the same in adjusted position.

6. In a micrometer having a frame, an internal threaded barrel and a threaded measuring rod, a separate member provided with threads engaging the threads of said barrel, and provided with threads engaging the threads of said measuring rod for advancement of said rod upon rotation relative to said member, said member being longitudinally split throughout and along said threads to provide resilience of the member to frictionally resiliently engage the threads of the measuring rod and the threads of said barrel.

CHARLES W. EDDY.